(12) United States Patent
Schlosser et al.

(10) Patent No.: US 9,073,083 B2
(45) Date of Patent: Jul. 7, 2015

(54) PROCESS AND SEAL COAT FOR IMPROVING PAINT ADHESION

(75) Inventors: Ted M. Schlosser, Tamaqua, PA (US); José B. Rivera, Auburn, PA (US)

(73) Assignee: Bulk Chemicals, Inc., Reading, PA (US)

( * ) Notice: Subject to any disclaimer, the term of this patent is extended or adjusted under 35 U.S.C. 154(b) by 219 days.

(21) Appl. No.: 12/968,945

(22) Filed: Dec. 15, 2010

(65) Prior Publication Data

US 2012/0152754 A1 Jun. 21, 2012

(51) Int. Cl.

| | |
|---|---|
| *B05D 3/10* | (2006.01) |
| *C09D 5/00* | (2006.01) |
| *C09D 5/08* | (2006.01) |
| *C23C 22/62* | (2006.01) |
| *C23C 22/68* | (2006.01) |
| *C09D 129/04* | (2006.01) |
| *C25D 13/20* | (2006.01) |
| *B05D 7/00* | (2006.01) |

(52) U.S. Cl.
CPC . *B05D 3/102* (2013.01); *B05D 7/51* (2013.01); *C09D 5/002* (2013.01); *C09D 5/084* (2013.01); *C23C 22/62* (2013.01); *C23C 22/68* (2013.01); *C09D 129/04* (2013.01); *C25D 13/20* (2013.01)

(58) Field of Classification Search
CPC ........ B05D 3/102; C09D 5/002; C09D 5/084; C09D 129/04; C23C 22/62; C23C 22/68; C25D 13/20; C08K 3/24; C08K 5/544; B06D 7/51
USPC .......................................................... 148/247
See application file for complete search history.

(56) References Cited

U.S. PATENT DOCUMENTS

| | | | |
|---|---|---|---|
| 5,700,523 A | 12/1997 | Petrole | |
| 5,801,217 A | 9/1998 | Rodzewich | |
| 5,905,105 A | 5/1999 | Jones | |
| 6,805,756 B2 | 10/2004 | Claffey | |
| 6,821,633 B2 | 11/2004 | Liu | |
| 7,517,591 B2 | 4/2009 | Miyoshi | |
| 8,182,874 B2 * | 5/2012 | Kolberg et al. | 427/352 |
| 2005/0084616 A1 * | 4/2005 | Rivera et al. | 427/331 |
| 2006/0214137 A1 | 9/2006 | Schlosser | |
| 2007/0298174 A1 * | 12/2007 | Kolberg et al. | 427/352 |
| 2008/0138615 A1 | 6/2008 | Kolberg et al. | |
| 2009/0114118 A1 | 5/2009 | Moore | |

FOREIGN PATENT DOCUMENTS

| | | |
|---|---|---|
| EP | 1 017 880 B2 | 5/2002 |
| EP | 1918419 | 5/2008 |

OTHER PUBLICATIONS

International Search Report for International Application No. PCT/US2011/062339 dated Jun. 26, 2012.

* cited by examiner

*Primary Examiner* — Kishor Mayekar
(74) *Attorney, Agent, or Firm* — Stradley Ronon Stevens & Young, LLP

(57) ABSTRACT

Aqueous compositions useful as pretreatments prior to painting and to reduce the formation of rust in the uncoated condition consist essentially of water, an organo-functional silane, a compound of a Group IV-B element, and optionally a polyvinyl alcohol, stabilizing agents, wetting agents, thickeners, and biocides, and have an alkaline pH>7. A process for treating a metal surface includes contacting the surface with such an aqueous composition. The compositions and processes were found to have further benefits in comparison to the zinc phosphate metal pretreatment thought to be the standard in the industry. Preferably, the pH of the compositions is alkaline, which has been found to improve the efficacy of a silane as a surface treatment to improve uniformity of paint adhesion. By operating in the alkaline pH range, it was found that flash rusting and/or blush rust were significantly reduced.

28 Claims, No Drawings

PROCESS AND SEAL COAT FOR IMPROVING PAINT ADHESION

FIELD OF THE INVENTION

This invention relates to compositions and the use of such compositions for passivating and improving the paint adhesion of metal surfaces. The invention may be used as a pre-paint treatment and is intended to be used to treat a range of metals including alloys of copper, brass, magnesium, aluminum, and iron. The process and seal coat have been found to demonstrate good paint adhesion results, particularly for paint applied by electrocoating.

BACKGROUND OF THE INVENTION

Known methods of treating metal surfaces to improve paint adhesion and corrosion resistance of painted metal surfaces include two general classes of chemistries. The first class is based on traditional conversion coating types of chemistries, such as zinc phosphate, iron phosphates, chromium chromate, chromium phosphate, etc. The second class is based on more recent developments in the metal pretreatment industry and is characterized by what is now referred to as "dried-in-place" technology. Traditional conversion coating chemistries require rinsing of the metal substrate to remove applied pretreatment solution. Dried-in-place chemistries allow for the applied solutions to be dried on the metal substrate to which they are applied, without rinsing prior to the application of a paint.

Chromium compounds have been used as traditional conversion coatings to treat metal surfaces. Hexavalent chromium compounds show toxicological effects and have been determined by the Environmental Protection Agency to be a risk to the environment and by the Occupational Safety and Health Agency to be a health risk. Moreover, hexavalent chromium compounds such as chromic acid are used in some of these systems and are classified as carcinogens by these agencies.

As a result, much effort has been expended in developing compositions and methods for producing chromium-free pretreatments. For example, the owner of the present application has commercialized products that are successful in improving the corrosion resistance and paint adhesion of metal surfaces. Such compositions are disclosed in, for example, U.S. Pat. No. 5,859,106 to Jones et al, directed to an aqueous composition including a polymer system having carboxylic functional groups and hydroxyl groups and a compound of a group IV-B element.

Zinc phosphate coating solutions are commonly known in the art to pre-treat metal surfaces, such as cold-rolled steel, prior to sealing and/or painting. As known to one having ordinary skill in the art, zinc phosphate coatings have been used for years to improve the adhesion of paint and other finishes to metal surfaces and to achieve corrosion resistance with these finishes. Some proprietary oil and wax formulations now on the market are capable of withstanding up to 240 hours Neutral Salt Spray (according to ASTM B117). Studies have shown that zinc phosphate coatings isolate corrosion sites and that the morphology of the zinc phosphate provides physical anchoring sites for sealing and/or painting solutions, which may be applied to the surface in subsequent processing steps. However, zinc phosphate solutions are not without their drawbacks. The drawbacks associated with the application of a zinc phosphate coating solution include the additional process steps which are required in its application, such as rinsing and heating the surface after application of the zinc phosphate solution. These additional steps require a considerable amount of time and energy consumption. Additionally, zinc phosphate processes are not environmentally-friendly as they contain phosphates and heavy metals, utilize large quantities of water for rinsing, and often cause high amounts of sludging in the process which causes solid and liquid waste disposal issues.

SUMMARY OF THE INVENTION

A pretreatment and seal coat composition has now been discovered that meets or exceeds the performance characteristics of traditional zinc phosphate solutions, without the energy consumption and environmental concerns of known zinc phosphate pretreatments, and without requiring all of the additional process steps in some embodiments. The compositions of the present invention may be used for passivating and improving the paint adhesion of metal surfaces. The invention may be used as a pre-paint treatment for a range of metals including alloys of copper, brass, magnesium, aluminum, and iron. Additionally, it has now been found that the alkalinity of the compositions of the present invention aids in the compositions adherence to the metal surface, enhancing the surface coating characteristics of the treatment.

The present invention relates to an aqueous pretreatment composition for forming a coating on a metal surface to passivate the surface, improve paint adhesion, and/or improve corrosion resistance. In one embodiment, the aqueous pretreatment composition consists essentially of water, an organo-functional silane, a compound of a Group IV-B element, and optionally a polyvinyl alcohol, stabilizing agents, wetting agents, thickeners, and biocides, wherein the composition has an alkaline pH>7.

In another embodiment, the present invention is a process for treating a metal surface by contacting the metal surface with an aqueous pretreatment composition consisting essentially of water, an organo-functional silane, a compound of a Group IV-B element, and optionally a polyvinyl alcohol, stabilizing agents, wetting agents, thickeners, and biocides, wherein the composition has an alkaline pH>7. The processes may additionally comprise, before the first contacting step, the step of cleaning the metal surface with an aqueous silicated cleaner and rinsing. The processes may further comprise, after contacting the metal surface with the pretreatment composition, the steps of rinsing the metal surface with water and then painting the surface of the metal.

In another embodiment, the present invention is a process for treating a metal surface. The process includes the steps of contacting the metal surface with an aqueous composition comprising silica and fluorozirconic acid, and then contacting the metal surface with an aqueous pretreatment composition consisting essentially of water, an organo-functional silane, a compound of a Group IV-B element, and optionally a polyvinyl alcohol, stabilizing agents, wetting agents, thickeners, and biocides, wherein the composition has an alkaline pH>7. The processes may additionally comprise, before the first contacting step, the step of cleaning the metal surface with an aqueous silicated cleaner and rinsing. The processes may further comprise, after contacting the metal surface with the pretreatment composition, the steps of rinsing the metal surface with water and then painting the surface of the metal. The process has been found to demonstrate good paint adhesion results, particularly for paint applied by electrocoating. The pH of the aqueous pretreatment composition consisting of water, an organo-functional silane, a fluorozirconic acid, and optionally a polyvinyl alcohol, as a working bath, is in the alkaline range >7 and may range from about 7 to about 11, preferably from about 7 to about 8.5, and most preferably from about 7.3 to about 8.3.

In another embodiment, the present invention relates to an aqueous pretreatment composition consisting of water, an organo-functional silane, a fluorozirconic acid, and optionally a polyvinyl alcohol, stabilizing agents, wetting agents, thickeners, and biocides, wherein the composition has an alkaline pH>7.

DETAILED DESCRIPTION OF THE INVENTION

The present invention is directed to chromium-free compositions and methods for treating metal surfaces to improve paint adhesion and corrosion resistance. Compositions according to the present invention consist essentially of water, an organo-functional silane, a compound of a Group IV-B element, and optionally a polyvinyl alcohol, stabilizing agents, wetting agents, thickeners, and biocides, wherein the composition has an alkaline pH>7. Processes according to the present invention include contacting the metal surface with the aqueous pretreatment composition consisting essentially of water, an organo-functional silane, a compound of a Group IV-B element, and optionally a polyvinyl alcohol, stabilizing agents, wetting agents, thickeners, and biocides, wherein the composition has an alkaline pH>7.

The present invention further provides processes which include the steps of contacting the metal surface with an aqueous composition comprising silica and fluorozirconic acid, and then contacting the metal surface with the aqueous pretreatment composition. The processes may additionally comprise, before the rinsing step, the step of cleaning the metal surface with an aqueous silicated cleaner and rinsing. The processes may further comprise, after contacting the metal surface with an aqueous pretreatment composition, the steps of rinsing the metal surface with water and then painting the surface of the metal. Alternatively, the pretreatment composition may be dried-in-place (i.e., not rinsed), then painted.

The present invention provides chrome-free compositions and processes for treating metal which are environmentally-friendly, energy-efficient, and reduce process steps, while still maintaining excellent paint adhesion and corrosion resistance. Furthermore, the alkaline pH of compositions of the present invention has been found to improve the efficacy of a silane, particularly an aminosilane, as a surface treatment to improve uniformity of paint adhesion. By operating in the alkaline pH range, it was found that flash rusting and/or blush rust were significantly reduced. The compositions and processes of the present invention were found to have further benefits in comparison to the zinc phosphate metal pretreatment thought to be the standard in the industry. Zinc phosphate solutions have been the standard pretreatment composition because of their performance ability. However, zinc phosphate solutions result in sludge formation, have high phosphates which cause environmental concerns, and are energy intensive because of a higher process temperature. Furthermore, the use of zinc phosphate solutions for metal pretreatment requires a titanium-phosphate activating rinse. The present invention provides environmentally friendly, energy-efficient compositions and processes for treating metal that do not require an activating step, yet produce similar or better metal pretreatment results.

As used herein, the term "pretreatment composition" means any composition which improves the paint adhesion and corrosion resistance of a metal surface. Aqueous pretreatment compositions of the present invention are used as a pretreatment prior to painting and may be used as a passivation treatment to reduce the formation of rust in the uncoated (unpainted) condition. Thus, while the composition is referred to herein as a pretreatment composition for convenience, it is a composition used for pretreatment (i.e., improving the adhesion of subsequently applied paint) and passivation (i.e., resisting corrosion of the unpainted surface). The coating composition results in approximately equal performance to or shows an improvement over conventional passivation coatings which contain hexavalent chromium.

As used herein, the term "treating" shall mean applying a treatment, or cleaning, rinsing, and applying a pretreatment of the present invention. The pretreatment of the present invention also functions as a sealant to seal the metal surface, so the term "treating" shall optionally include the step of sealing the metal surface. Further, "treating" optionally can include process steps up through and including painting. For example, treatment steps may also include a step of applying a decorative coating, such as painting by electrocoating. After applying the pretreatment of the present invention, the pretreatment may be rinsed first or dried-in-place before application of the paint. Each of these steps above play a role in a final product's ability to resist corrosion and minimize paint loss, as is well-known in the art. As mentioned above, the treatment composition of the present invention can be used as a pre-paint treatment without the use of chromium.

As used herein, the term "metal," used for example in the phrase "metal surface," includes aluminum, iron, zinc, and combinations thereof. Each metal listed includes both the elemental metal and alloys thereof; for example, the term "aluminum" means aluminum and aluminum alloys. The term "alloy" is a metal in which the primary metal has the highest content of every other element or a content equal to the highest content of every other element, e.g. an aluminum alloy being a metal in which aluminum is present in an amount at least equal to that of any other element. Iron alloys include cold rolled steel, electro-galvanized steel, and hot-dipped galvanized steel. Preferably, compositions of the present invention are used to treat a range of metals including alloys of copper, brass, magnesium, aluminum, and iron.

As used herein, the term "silane" has the same meaning as defined in U.S. Pat. No. 5,393,353 to Bishop, which is incorporated herein by reference. In addition, the term "organo-functional silane" has the same meaning as defined in U.S. Pat. No. 6,126,997 to Rivera et al., also incorporated herein by reference. Specifically, the term "organo-functional silane" means a compound having: (1) a silane radical (e.g., silyl (—$SiH_3$), disilanyl (—$Si_2H_5$), etc.); (2) an organic group (such as an alkyl, an aryl or an alkoxy group); and (3) a functional group. Such functional groups include, but are not limited to, amino, epoxy, vinyl, and mercapto groups. Exemplary organo-functional silanes which can be used according to the present invention include aminopropyltriethoxy silanes, mercapto silanes, and epoxy silanes. Without being bound to any theory, it is believed that the organo-functional silane serves to bond with, or assist in bonding among, either the other constituents in the treatment composition or the constituents of other compositions or the metal surface itself or some combination thereof. Various silanes may be suitably employed by the present invention. Preferably, the organo-functional silane is an aminopropyltriethoxy silane, such as that sold under the trade name AMEO by Degussa AG of Dusseldorf, Germany, or under the trade name Silwet® A-1100 by Crompton Corporation of Greenwich, Conn.

As used herein, the term "compound of a group IV-B element" means an acid and/or a salt of a group IV-B element, as described in U.S. Pat. No. 5,859,106 to Jones et al., incorporated herein by reference. Such acids include fluorozirconic acid ($H_2ZrF_6$), fluorotitanic acid ($H_2TiF_6$), and fluorohafnic acid ($H_2HfF_6$). An exemplary salt of a Group IV-B element is ammonium zirconium carbonate. Without wishing to be bound by any particular theory or explanation, it appears that the group IV-B element, such as zirconium, increases the interaction between the composition and the metal surface, in effect helping to bond the composition to the metal surface.

As used herein, the term "polyvinyl alcohol" is meant as a water-soluble synthetic polymer having the working empirical formula of $(C_2H_4O)_x$. Suitable polyvinyl alcohols may be chosen from a wide range of molecular weights, and may or may not be essentially fully hydrolyzed. That is, they may or may not be essentially free of acetate ester content. Higher molecular weight PVA's, for example those in the range of 146,000 to 186,000 Daltons, have generally been found to work better than lower molecular weight (e.g., 85,000-124,000 Daltons) versions for coil coating. Superhydrolyzed (<1 mole % ester content), relatively low molecular weight grades of PVA, for example a product sold as Celvol™ 125 by Celanese (Calvert City, Ky.), may provide particularly good passivation performance on steel substrates, while higher molecular weight and less completely hydrolyzed PVA's (for example Celvol™ 340 and Celvol™ 540) may tend to give better performance on zinc substrates. Mixtures of PVA's having different molecular weight ranges and different degrees of hydrolysis may also be used, and may provide good all-around performance. For example, an approximately 2:1 weight ratio of Celvol™ 125 to Celvol™ 540 may give good overall performance on a variety of substrates.

The compositions of the present invention may additionally include constituents that do not affect the basic and novel characteristics of the present invention. For example, a stabilizing agent may be to added to improve the shelf-life and stability of the compositions. Stabilizing agents, such as ammonium biborate, may be particularly useful for this purpose when a silica is employed. The stabilizing agent may prevent the colloidization of the silica in solution, thereby preventing the fall-out of the silica. Without being held to the theory, it is believed that the stabilizing agent ties up free fluoride and buffers the solution, which prevents the reaction of the free fluoride with silica in the solution. Additional components that are well-known in the art could be included in compositions of the present invention. For example, wetting agents, such as fluorosurfactants, may be included to improve wetting. In some cases, thickeners might also be included if an application requiring a higher viscosity is needed. Finally, if necessary, a compatible biocide, such as a 1,2-benzisothiazolin-3-one biocide sold under the trademark NIPACIDS BIT 20 by Clarion of Charlotte, N.C. or a product sold under the trademark NUOSEPT 495 by ISP Chemicals of Calvert City, Ky., can be included to inhibit biological growth in a working bath. Components such as, for example, stabilizing agents, wetting agents, thickeners, and biocides may be added to the compositions of the present invention without affecting the basic and novel characteristics.

The concentrations of the constituents of the present invention, as well as the application temperature and residence time, can vary over a wide range and can be modified in a known manner, depending on the desired coating weight. In addition, the desired coating weight will be a function of the type of metal, the timing of processing after application of the pretreatment, the environmental conditions to which the treated metal is exposed, and the type of decorative coating used, among other factors. The coating process can be effected by employing any of the coating techniques known in the art. Contact can be effected by spray, immersion or flow coating techniques. The amount of coating should be sufficient to achieve the desired characteristics of the dried metal for its intended use. For example, in certain situations the amount of coating desired will be sufficient to obtain from about 3.0 to 40.0 milligrams of the dried coating per each square foot of dried metal surface. By using a solution of higher concentrations (which can be achieved by the addition of ammonia), it is possible to leave the desired amount of the dried coating with less solution.

Component concentrations of a working bath of the present metal pretreatment can vary over a wide range. Appropriate concentration ranges of the various components are primarily dependent upon their solubilities, as is known in the art. Above the solubility limits, the solute may begin to come out of the solution. At concentrations too low, there is insufficient amounts of the constituents to achieve the desired coating weight in a reasonable time and to perform their functions. Formulating compositions according to the invention in light of these constraints is well within the ability of the person of normal skill in the art. Additionally, while these compositions may be provided as a concentrate, they are generally utilized as a dilution with distilled water. In an embodiment of the invention in which the compound of a group IV-B element is fluorozirconic acid, the organo-functional silane is aminopropyltriethoxy silane, and the composition contains polyvinyl alcohol, the following ranges have been found to be preferred given certain other conditions: 0.01 to 0.05 wt % of fluorozirconic acid (as $H_2ZrF_6$); from 0.05 to 0.5 wt % aminopropyltriethoxy silane; and from $1.0 \times 10^{-4}$ to $2.0 \times 10^{-3}$ wt % polyvinyl alcohol. More preferably, the ranges are: 0.02 to 0.04 wt % of fluorozirconic acid (as $H_2ZrF_6$); from 0.15 to 0.30 wt % aminopropyltriethoxy silane; and from $5.0 \times 10^{-4}$ to $1.0 \times 10^{-3}$ wt % polyvinyl alcohol. The compositions given above are of the working bath. It is, of course, desirable to ship the product in the form of a concentrate, namely up to a 10 to 100 fold increase, preferably a 50 fold increase, in concentration of the above working bath concentrations.

The pH of the present metal treatments can vary over a wide range, as mentioned above. The pH of the compositions of the present invention, such as the composition consisting of water, an organo-functional silane, a fluorozirconic acid, and optionally a polyvinyl alcohol, as a working bath, is in the alkaline range >7. Specifically, the alkaline pH of the composition is in the range of about 7 to about 11, preferably in the range of about 7 to about 8.5, and most preferably from about 7.3 to about 8.3. The alkalinity of the compositions of the present invention aids in the compositions adherence to the metal surface, enhancing the surface coating characteristics of the treatment. Specifically, the alkaline pH of compositions of the present invention has been found to improve the efficacy of a silane, such as an aminosilane, as a surface treatment to improve uniformity of paint adhesion. By operating in the alkaline pH range, it was found that flash rusting and/or blush rust were significantly reduced.

Compositions according to the invention may be made by mixing the ingredients in any of a number of sequences. The order of addition of the constituents is not critical. In one embodiment, the organofunctional silane is added to water before the acid of Group IV-B element. In an embodiment which includes polyvinyl alcohol, the polyvinyl acid is added to water first, then the organofunctional silane is added to that solution, and finally the acid of Group IV-B element is added to that solution. This is typically done all as a concentrate, so the concentrate is diluted at the metal treatment site prior to use.

Treatment of metal surfaces according to the invention typically includes contacting the metal surface with an aqueous pretreatment composition consisting essentially of water, an organo-functional silane, a compound of a Group IV-B element, and optionally a polyvinyl alcohol, stabilizing agents, wetting agents, thickeners, and biocides, wherein the composition has an alkaline pH>7. The process may further include the steps of, before the contacting step, contacting the metal surface with an aqueous composition comprising silica and fluorozirconic acid, and then contacting the metal surface with the aqueous pretreatment composition. The processes may additionally include, before the rinsing step, the step of cleaning the metal surface with an aqueous silicated cleaner and rinsing. The processes may further include, after contacting the metal surface with the aqueous pretreatment composition, the steps of rinsing the metal surface with water and then painting the surface of the metal. Alternatively, the pretreatment composition may be dried-in-place (i.e., not rinsed), then painted.

Contacting of the metal surface may be performed by any known coating technique, including for example spraying, immersing, roll coating, or flow coating. Optionally, after contacting the rinsed metal surface with a composition comprising an organo-functional silane, and a compound of a group IV-B element, the metal surface is dried and then a decorative coating (e.g. painting) is applied, without rinsing between these steps. Thus, the pretreatment is a "dried-in-place" pretreatment in this embodiment.

The cleaning step removes oil and other contaminants from the surface of the metal, and is typically effected by immersing the metal surface in a bath of a silicated alkaline cleaning solution to form a cleaned metal surface. The silicated alkaline cleaning solution may be an aqueous solution of a silicated alkaline cleaning agent. Such a silicated alkaline cleaning solution is sold by Bulk Chemicals Inc., Reading, Pa., under the brand name Bulk Kleen. Some exemplary silicated alkaline cleaning agents which can be used according to the present invention include sodium carbonate, sodium hydroxide, and potassium hydroxide. Alternatively, the cleaning step may be carried out by an acidic composition. Other means of cleaning may also be used in addition to, or instead of, silicated alkaline cleaning baths. In some cases, cleaning may not be required at all, and this step may be omitted.

A metal surface which has been contacted by a silicated alkaline cleaning solution is referred to herein as a "cleaned metal surface." It is cleaned in the sense it has been exposed to the silicated alkaline cleaning solution. It is not completely free of contaminants, however, inasmuch as vestiges of the bath and other impurities may remain. Only after it is rinsed with water can it be viewed as fully cleaned and ready to make contact with a pretreatment composition (i.e., substantially all of the impurities are, by that point, removed). The rinsing step is a conventional water rinsing step, preferably using deionized water, to remove any excess cleaner or detergent left on the metal surface from the cleaning step. The use of deionized water avoids the introduction of any deleterious ions, such as chloride ions, into the system. After the metal surface is rinsed, it is treated with an aqueous composition of the sort described above according to the invention.

When the process includes the steps of contacting the metal surface with an aqueous composition comprising silica and fluorozirconic acid prior to the step of contacting the metal surface with an aqueous pretreatment composition, a combination aqueous solution of fluorozirconic acid and colloidal silica may be used. For example, the concentrated product sold by Bulk Chemicals Inc. of Reading, Pa., under the tradename ZIRCA-SIL, may be used for this purpose. In a preferred embodiment which employs this additional step, a 5% dilution of the concentrated ZIRCA-SIL product is used. The bath containing this combination aqueous solution is an acidic bath, with a pH range of about 4.4. to about 5.2.

As mentioned above, one well-known coating technique is reverse roll coating, whereby a sheet of metal is pulled between counter-rotating cylinders, which are rotating against the direction of travel of the sheet being unrolled. The solution is rolled down along these cylinders until it contacts the metal. As the sheet metal is passed between the cylinders in a direction against the direction of rotation of the cylinders, some wiping force is applied to the metal. Another conventional method is known as the quick-dip method, whereby sheet metal is dipped into a batch containing the coating composition and is subsequently passed between two rolls to remove the excess. As will be appreciated by one of normal skill in the art, the concentration, temperature, and pH of the bath are interrelated. Preferably, the bath temperature during this contacting step is about 70° F. to about 150° F., although the temperature can vary over a wide range depending on concentration and pH. The bath pH depends on the particular pretreatment composition used.

After pretreatment, the metal is preferably then dried (e.g., by blown air or by an oven). The temperatures for the drying operation may range from about 60° F. to about 500° F. The length of the drying step will depend upon the temperature utilized. In addition, air may be blown over the metal to enhance the evaporation.

The desirable performance characteristics of the present invention can be achieved by the processing steps described above to produce a pretreated metal surface with good paint adhesion and corrosion resistance. These characteristics are obtained on the metal surface without a decorative coating. Accordingly, the treated metal surface can be used as unpainted products and will exhibit corrosion resistance even if there is a delay between the treatment steps and any subsequent painting.

A decorative paint coating may be applied to the dried metal surface. Typical non-limiting examples of decorative coatings include paints and lacquers, including electrocoated paints. Suitable paints are available from a number of vendors. A top coat may be applied to the treated metal surface, either as a treated surface or as a treated and painted surface. For example, a suitable polyester triglycidyl isocyanurate (TGIC) powder coating top coat is sold by DuPont of Wilmington, Del., under the tradename Alesta® AR. Typically, no rinsing is performed after contacting the rinsed metal surface with the treatment composition and application of the decorative coating. In this way, the generation of waste is minimized. The dried-in-place composition of the present invention serves to adhere the paint or lacquer to the metal and to minimize corrosion.

The methods and compositions of the present invention can be applied in a wide variety of applications. These applications include, as non-limiting examples, extrusion applications and coil coating.

In sum, the present invention provides environmentally friendly compositions and processes for treating metal, while still maintaining excellent paint adhesion and corrosion resistance. More particularly, the present invention avoids the use of chromium (both trivalent and hexavalent chromium), and its associated health hazards and disposal problems. Furthermore, the alkaline pH of compositions of the present invention has been found to improve the efficacy of aminosilane as a surface treatment to improve uniformity of paint adhesion.

The compositions and processes of the present invention were found to have further benefits in comparison to the zinc phosphate metal pretreatment thought to be the standard in the industry. Zinc phosphate solutions have been the standard pretreatment composition because of their performance ability. However, zinc phosphate solutions result in sludge formation, have high phosphates which cause environmental concerns, and are energy intensive because of a higher process temperature. Furthermore, the use of zinc phosphate solutions for metal pretreatment requires a titanium-phosphate activating rinse. The present invention provides environmentally friendly, energy-efficient compositions and processes for treating metal that do not require an activating step, yet produce similar or better metal pretreatment results.

The compositions and processes of the present invention provide these benefits without the use of additional components which effect the basic and novel characteristics of the invention. Other components, when added to the composition in sufficient amounts, may affect the basic and novel characteristics. For example, certain components may make the compositions unstable. Such components may cause the solution to polymerize and affect the shelf-life of the treatment. Other components may degrade the performance of the compositions and processes of the present invention.

EXAMPLES

The following examples are included to more clearly demonstrate the overall nature of the present invention. Examples 1-3 illustrate the improved results obtained by employing aqueous compositions of this invention.

Example 1

Example 1 provides the results of samples treated with various processes under 1000 hours of Neutral Salt Spray (according to ASTM B117). The tests were performed on cold-rolled steel panel samples. Six panels were tested for each test process and composition. The test compositions, comparative formulations, and treatment processes are detailed in Table 1 below.

All of the test panels were cleaned with a potassium-based alkaline preparation (Bulk Kleen™ 842) commonly used to clean metal parts. The alkaline cleaner was prepared at 2% by volume and heated to 140° F. Panels were sprayed for 10 seconds and then rinsed with tap water for 5 seconds. The panels were then dried and divided into groups for application of experimental coatings. For test panels contacted with a combination aqueous solution of fluorozirconic acid and colloidal silica, a 5% dilution of the concentrated product sold by Bulk Chemicals Inc. of Reading, Pa., under the tradename ZIRCA-SIL 18 was used. The 5% dilution contains 0.03 wt % fluorozirconic acid and 0.0138 wt % colloidal silica, with the remainder made up of deionized water.

The panels were then spray coated with the following treatment compositions at ambient room temperature. The spray coating was applied at 15 psi for an exposure time of 45 seconds. The comparative formulation employed a zinc phosphate product sold by Bulk Chemicals Inc. of Reading, Pa., under the tradename Bulk Bond® 315. As known to one having ordinary skill in the art and as discussed above, zinc phosphate compositions are applied to metal surfaces at elevated temperatures. The comparative formulation was applied at 150° F. and had a pH between 1.5-2.0. The comparative formulation and treatment compositions tested were:

1. A comparative formulation and process, wherein the sample is contacted with a comparative formulation comprising 95 vol % distilled water and 5 vol % of the Bulk Bond® 315 zinc phosphate treatment (which resulted in a coating weight of 200 mg/ft$^2$), and then sealed with 0.2 vol % aminopropyltriethoxy silane;

2. A test composition and process, wherein the sample is spray contacted with a 5% dilution of ZIRCA-SIL 18, and then contacted with a test composition comprising 99.7236 wt % distilled water, 0.2 wt % aminopropyltriethoxy silane, 0.07 wt % fluorozirconic acid, and 0.0064 wt % polyvinyl alcohol, wherein the composition has an alkaline pH between 7.3-8.3;

3. A test composition and process, wherein the sample is contacted with 0.015 wt % ammonium biborate and a 5% dilution of ZIRCA-SIL 18, and then contacted with a test composition comprising 99.7236 wt % distilled water, 0.2 wt % aminopropyltriethoxy silane, 0.07 wt % fluorozirconic acid, and 0.0064 wt % polyvinyl alcohol, wherein the composition has an alkaline pH between 7.3-8.3;

4. A test composition and process, wherein the sample is contacted with a 5% dilution of ZIRCA-SIL 18 with double the standard quantity of silica (i.e., 0.0276 wt % colloidal silica), and then contacted with a test composition comprising 99.7236 wt % distilled water, 0.2 wt % aminopropyltriethoxy silane, 0.07 wt % fluorozirconic acid, and 0.0064 wt % polyvinyl alcohol, wherein the composition has an alkaline pH between 7.3-8.3.

All of the test panels were subsequently rinsed with water, dried in air, and then coated with a DuPont Alesta® AR 300 Vulcan Black polyester triglycidyl isocyanurate (TGIC) powder coating to form a film thickness of about 1.5 mils. The samples were cured at the recommended temperature of 400° F. for 10 minutes, allowed to cool, and then were tested for 1000 hours under Neutral Salt Spray (according to ASTM B117). The test panels were then visually observed and rated on a scale of 1-10 (10 being the highest) for corrosion resistance. These results are shown in Table 1 below.

It is noted that the treated metal surfaces tested in the Examples of the present invention were coated with a top coat, but not painted after treatment with the comparative formulation or test compositions. As can be appreciated by one having ordinary skill in the art, treated metal surfaces may show improved corrosion resistance after they are painted. Additional corrosion resistance may be added to the treated and painted metal surfaces by the use of a top coat, such as the powder coating employed in the Examples of the present invention. For purposes of comparative testing, however, the exemplary samples were not painted after treatment.

TABLE 1

| 1000 hours Neutral Salt Spray results. | | | | |
|---|---|---|---|---|
| Test Panel | Process 1 | Process 2 | Process 3 | Process 4 |
| 1 | 6 | 7 | 8 | 4 |
| 2 | 6 | 6 | 5 | 4 |
| 3 | 6 | 6 | 5 | 6 |
| 4 | 6 | 6 | 7 | 5 |
| 5 | 6 | 4 | 6 | 7 |
| 6 | 5 | 5 | 6 | 6 |
| Average | 5.83 | 5.67 | 6.17 | 5.33 |

The results show that test compositions according to the present invention are competitive with traditional zinc phosphate treatment formulations. The compositions of the present invention provide substantial corrosion resistance under 1000 hours of Neutral Salt Spray, competitive with that witnessed for the comparative zinc phosphate treatment, without the energy consumption, environmental concerns, and disposal issues associated with traditional zinc phosphate treatments.

Example 2

Example 2 provides the results of samples treated with various processes and formulations according to the various embodiments of the present invention. These samples were tested under Acid Salt Spray (according to ASTM B117) for 200 hours and 344 hours. The tests were performed on cold-rolled steel panel samples. Three panels were tested for each test process and composition. The test compositions, comparative formulations, and treatment processes are detailed in Tables 2a and 2b below.

All of the test panels were cleaned with a potassium-based alkaline preparation (Bulk Kleen™ 842) commonly used to clean metal parts. The alkaline cleaner was prepared at 2% by volume and heated to 140° F. Panels were sprayed for 10 seconds and then rinsed with tap water for 5 seconds. The panels were then dried and divided into groups for application of experimental coatings. For test panels contacted with a combination aqueous solution of fluorozirconic acid and colloidal silica, a 5% dilution of the concentrated product sold by Bulk Chemicals Inc. of Reading, Pa., under the tradename ZIRCA-SIL 18 was used. The 5% dilution contains 0.03 wt % fluorozirconic acid and 0.0138 wt % colloidal silica, with the remainder made up of deionized water.

The panels were then spray coated with the following treatment compositions at ambient room temperature. The spray coating was applied at 15 psi for an exposure time of 45 seconds. The treatment compositions were:

1. A test composition and process, wherein the sample is contacted with a 5% dilution of ZIRCA-SIL 18;
2. A test composition and process, wherein the sample is contacted with 0.03 wt % hexafluorozirconate (no silica);
3. A test composition and process, wherein the sample is contacted with 0.015 wt % ammonium biborate and a 5% dilution of ZIRCA-SIL 18;
4. A test composition and process, wherein the sample is contacted with 0.07 wt % hydrofluorosilicic acid;
5. A test composition and process, wherein the sample is contacted with a 5% dilution of ZIRCA-SIL 18, rinsed with water, and then contacted with a test composition comprising 99.73 wt % distilled water, 0.2 wt % aminopropyltriethoxy silane, and 0.07 wt % fluorozirconic acid, wherein the composition has an alkaline pH between 7.3-8.3;
6. A test composition and process, wherein the sample is contacted with 0.03 wt % hexafluorozirconate (no silica), rinsed with water, and then contacted with a test composition comprising 99.73 wt % distilled water, 0.2 wt % aminopropyltriethoxy silane, and 0.07 wt % fluorozirconic acid, wherein the composition has an alkaline pH between 7.3-8.3;
7. A test composition and process, wherein the sample is contacted with 0.015 wt % of ammonium biborate and a 5% dilution of ZIRCA-SIL 18, rinsed with water, and then contacted with a test composition comprising 99.73 wt % distilled water, 0.2 wt % aminopropyltriethoxy silane, and 0.07 wt % fluorozirconic acid, wherein the composition has an alkaline pH between 7.3-8.3;
8. A test composition and process, wherein the sample is contacted with 0.03 wt % hydrofluorosilicic acid, rinsed with water, and then contacted with a test composition comprising 99.73 wt % distilled water, 0.2 wt % aminopropyltriethoxy silane, and 0.07 wt % fluorozirconic acid, wherein the composition has an alkaline pH between 7.3-8.3.

All of the test panels were subsequently rinsed with water, dried in air, and then coated with a DuPont Alesta® AR 300 Vulcan Black polyester triglycidyl isocyanurate (TGIC) powder coating to form a film thickness of about 1.5 mils. The samples were cured at the recommended temperature of 400° F. for 10 minutes, allowed to cool, and then were tested under Acid Salt Spray (according to ASTM B117). The test panels were then visually observed and rated on a scale of 1-10 (10 being the highest) for corrosion resistance. As stated above for Example 1, the treated metal surfaces were not painted after treatment but were powder coated. Treated metal surfaces may be painted and/or powder coated for industrial use.

TABLE 2a 200 hours Acid Salt Spray results.

| Test Panel | Process 1 | Process 2 | Process 3 | Process 4 | Process 5 | Process 6 | Process 7 | Process 8 |
|---|---|---|---|---|---|---|---|---|
| 1 | 9 | 9 | 9 | 7 | 10 | 10 | 10 | 7 |
| 2 | 9 | 9 | 10 | 7 | 10 | 10 | 10 | 7 |
| 3 | 9 | 10 | 10 | 7 | 10 | 10 | 9 | 7 |
| Average | 9.00 | 9.33 | 9.67 | 7.00 | 10.00 | 10.00 | 9.67 | 7.00 |

TABLE 2b 344 hours Acid Salt Spray results.

| Test Panel | Process 1 | Process 2 | Process 3 | Process 4 | Process 5 | Process 6 | Process 7 | Process 8 |
|---|---|---|---|---|---|---|---|---|
| 1 | 7 | 8 | 8 | n/a | 9 | 9 | 8 | n/a |
| 2 | 7 | 8 | 8 | n/a | 9 | 9 | 8 | n/a |
| 3 | 7 | 8 | 8 | n/a | 9 | 8 | 8 | n/a |
| Average | 7.00 | 8.00 | 8.00 | n/a | 9.00 | 8.67 | 8.00 | n/a |

The results show that test compositions according to the present invention are effective for corrosion resistance. The tests also show that silica in the treatment process does not add substantially to the corrosion resistance of the sample. Similarly, the stabilizing agent ammonium biborate does not add substantially to the corrosion resistance of the sample. However, both silica and ammonium biborate may be employed, either individually or together, to achieve other performance characteristics of the treatment. For example, the use of silica and ammonium biborate may aid in the prolonging the stability and shelf-life of the treatment compositions.

Example 3

Example 3 provides the results of samples treated with various processes and formulations according to the various embodiments of the present invention. These samples were tested under Acid Salt Spray (according to ASTM B117) for 200 hours. The tests were performed on cold-rolled steel panel samples. Three panels were tested for each test process and composition. The test compositions, comparative formulations, and treatment processes are detailed in Table 3 below.

All of the test panels were cleaned with a potassium-based alkaline preparation (Bulk Kleen™ 842) commonly used to clean metal parts. The alkaline cleaner was prepared at 2% by volume and heated to 140° F. Panels were sprayed for 10 seconds and then rinsed with tap water for 5 seconds. The panels were then dried and divided into groups for application of experimental coatings.

The panels were then spray coated with the following treatment compositions at ambient room temperature. The spray coating was applied at 15 psi for an exposure time of 45 seconds. The treatment compositions were:

1. A test composition and process, wherein the sample is contacted with test composition comprising 99.7236 wt % distilled water, 0.2 wt % aminopropyltriethoxy silane, 0.07 wt % fluorozirconic acid, and 0.0064 wt % polyvinyl alcohol, wherein the composition has an alkaline pH between 7.3-8.3, and the sample is then allowed to dry-in-place;

2. A test composition and process, wherein the sample is contacted with test composition comprising 99.7236 wt % distilled water, 0.2 wt % aminopropyltriethoxy silane, 0.07 wt % fluorozirconic acid, and 0.0064 wt % polyvinyl alcohol, wherein the composition has an alkaline pH between 7.3-8.3, and the sample is then rinsed with water;

3. A test composition and process, wherein the sample is contacted with test composition comprising 99.73 wt % distilled water, 0.2 wt % aminopropyltriethoxy silane, and 0.07 wt % fluorozirconic acid, wherein the composition has an alkaline pH between 7.3-8.3, and the sample is then allowed to dry-in-place;

4. A test composition and process, wherein the sample is contacted with test composition comprising 99.73 wt % distilled water, 0.2 wt % aminopropyltriethoxy silane, and 0.07 wt % fluorozirconic acid, wherein the composition has an alkaline pH between 7.3-8.3, and the sample is then rinsed with water.

All of the test panels were subsequently rinsed with water, dried in air, and then coated with a DuPont Alesta® AR 300 Vulcan Black polyester triglycidyl isocyanurate (TGIC) powder coating to form a film thickness of about 1.5 mils. The samples were cured at the recommended temperature of 400° F. for 10 minutes, allowed to cool, and then were tested under Acid Salt Spray (according to ASTM B117). The test panels were then visually observed and rated on a scale of 1-10 (10 being the highest) for corrosion resistance. As stated above for Example 1, the treated metal surfaces were not painted after treatment but were powder coated. Treated metal surfaces may be painted and/or powder coated for industrial use.

TABLE 3

| | 200 hours Acid Salt Spray results. | | | |
|---|---|---|---|---|
| Test Panel | Process 1 | Process 2 | Process 3 | Process 4 |
| 1 | 5 | 5 | 7 | 5 |
| 2 | 5 | 5 | 6 | 5 |
| 3 | 7 | 5 | 7 | 5 |
| Average | 5.67 | 5.00 | 6.67 | 5.00 |

The results show that test compositions according to the present invention are effective for corrosion resistance, and are preferably utilized for dried-in-place processes. Processes 1 and 3 both utilized a dried-in-place process, with process 1 including polyvinyl alcohol in the treatment composition and process 3 excluding polyvinyl alcohol. Processes 2 and 4 included final rinse steps, but resulted in less favorable corrosion resistance results. These tests showed that the compositions and processes of the present invention provide a suitable alternative to traditional zinc phosphate metal treatments, with superior results being achieved for dried-in-place applications.

The present invention thus provides a pretreatment and seal coat composition that meets or exceeds the performance characteristics of traditional zinc phosphate solutions, without the energy consumption and environmental concerns of known zinc phosphate pretreatments, and without requiring all of the additional process steps in some embodiments. The compositions of the present invention may be used for passivating and improving the paint adhesion of metal surfaces. The invention may be used as a pre-paint treatment for a range of metals including alloys of copper, brass, magnesium, aluminum, and iron. Additionally, the alkalinity of the compositions of the present invention aids in the compositions adherence to the metal surface, enhancing the surface coating characteristics of the treatment.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. An aqueous pretreatment composition for treating a metal surface, said composition consisting essentially of water, an organo-functional silane, a compound of a Group IV-B element, a polyvinyl alcohol in an amount of from $1.0 \times 10^{-4}$ to less than $1.0 \times 10^{-3}$ wt. % of the composition, and optionally stabilizing agents, wetting agents, thickeners, and biocides, wherein the composition has an alkaline pH>7.

2. The aqueous pretreatment composition of claim 1, wherein the compound of a group IV-B element is an acid selected from the group consisting of fluorozirconic acid, fluorotitanic acid, and fluorohafnic acid.

3. The aqueous pretreatment composition of claim 2, wherein the acid is fluorozirconic acid.

4. The aqueous pretreatment composition of claim 1, wherein the organo-functional silane is selected from the group consisting of an aminopropyltriethoxy silane, a mercapto silane, and an epoxy silane.

5. The aqueous pretreatment composition of claim 4, wherein the organo-functional silane is an aminopropyltriethoxy silane.

6. The aqueous pretreatment composition of claim 1, wherein the organo-functional silane is an aminopropyltriethoxy silane and the compound of a group IV-B element is fluorozirconic acid.

7. The aqueous pretreatment composition of claim 1, wherein the composition has a pH of from 7 to about 11.

8. The aqueous pretreatment composition of claim 1, wherein the composition has a pH of from >7 to about 8.5.

9. The aqueous pretreatment composition of claim 1, wherein the amount of polyvinyl alcohol is $5.0 \times 10^{-4}$ to less than $1.0 \times 10^{-3}$ wt % of the composition.

10. The aqueous pretreatment composition of claim 9, wherein the organo-functional silane comprises aminopropyltriethoxy silane and is present in an amount of 0.15 to 0.3 wt % of the composition and compound of a Group IV-B element comprises fluorozirconic acid and is present in an amount of 0.02 to 0.04 wt % of the composition.

11. The aqueous pretreatment composition of claim 1, wherein the organo-functional silane comprises aminopropyltriethoxy silane and is present in an amount of 0.05 to 0.5 wt % of the composition and compound of a Group IV-B element comprises fluorozirconic acid and is present in an amount of 0.01 to 0.05 wt % of the composition.

12. A process for treating a metal surface, said process comprising the step of: contacting the metal surface with an aqueous pretreatment composition consisting essentially of water, an organo-functional silane, a compound of a Group IV-B element, a polyvinyl alcohol in an amount of from $1.0 \times 10^{-4}$ to less than $1.0 \times 10^{-3}$ wt. % of the composition, and optionally stabilizing agents, wetting agents, thickeners, and biocides, wherein the composition has an alkaline pH>7.

13. The process of claim 12 further comprising, before the contacting step:
    contacting the metal surface with an aqueous composition comprising fluorozirconic acid and colloidal silica, followed by a water rinse.

14. The process of claim 13 further comprising, after contacting the rinsed metal surface with the aqueous pretreatment composition:
    applying a coating of paint to the metal surface.

15. The process of claim 13 further comprising, after contacting the rinsed metal surface with the aqueous pretreatment composition:
    rinsing the metal surface with water; and
    then applying a coating of paint to the metal surface.

16. The process of claim 15, wherein the applying step comprises applying a coating of paint to the metal surface by electrocoating.

17. The process of claim 12 further comprising, before the contacting step:
    cleaning the metal surface with an aqueous silicated cleaner and rinsing;
    then contacting the rinsed metal surface with an composition comprising fluorozirconic acid and colloidal silica, followed by a water rinse.

18. The process of claim 17 further comprising, after contacting the rinsed metal surface with the aqueous pretreatment composition:
    applying a coating of paint to the metal surface.

19. The process of claim 17 further comprising, after contacting the rinsed metal surface with an aqueous pretreatment composition:
    rinsing the metal surface with water; and
    then applying a coating of paint to the metal surface.

20. The process of claim 19, wherein the applying step comprises applying a coating of paint to the metal surface by electrocoating.

21. The process of claim 12, wherein the compound of a group IV-B element is an acid selected from the group consisting of fluorozirconic acid, fluorotitanic acid, and fluorohafnic acid.

22. The process of claim 21, wherein the acid is fluorozirconic acid.

23. The process of claim 12, wherein the organo-functional silane is selected from the group consisting of an aminopropyltriethoxy silane, a mercapto silane, and an epoxy silane.

24. The process of claim 23, wherein the organo-functional silane is the aminopropyltriethoxy silane.

25. The process of claim 12, wherein the organo-functional silane is an aminopropyltriethoxy silane and the compound of a group IV-B element is fluorozirconic acid.

26. The process of claim 12, wherein the composition has a pH of from >7 to about 11.

27. The process of claim 12, wherein the composition has a pH of from >7 to about 8.5.

28. An aqueous pretreatment composition for treating a metal surface, said composition consisting of water, an organo-functional silane, a fluorozirconic acid, a polyvinyl alcohol in an amount of from $1.0 \times 10^{-4}$ to less than $1.0 \times 10^{-3}$ wt. % of the composition, a stabilizing agent, a wetting agent, a thickener, and a biocide, wherein the composition has an alkaline pH>7.

* * * * *